(No Model.)
E. W. McCREADY.
BICYCLE HANDLE BAR.
No. 601,813. Patented Apr. 5, 1898.
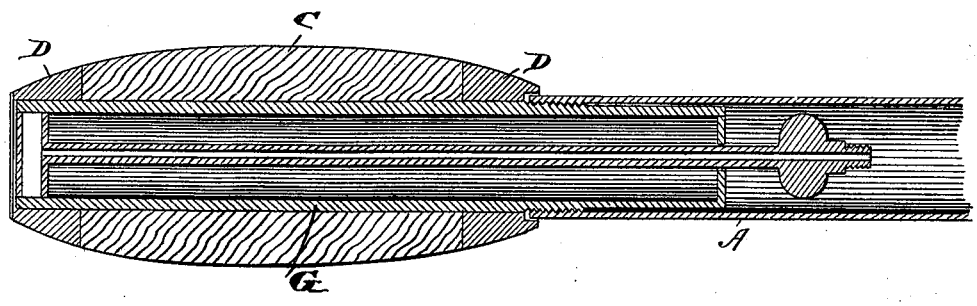
Witnesses,
J. S. Mann,
Frederick Goodwin
Inventor,
Edward W. McCready
By Offield, Towle & Linthicum
Attys

UNITED STATES PATENT OFFICE.

EDWARD W. McCREADY, OF OAK PARK, ILLINOIS.

BICYCLE HANDLE-BAR.

SPECIFICATION forming part of Letters Patent No. 601,813, dated April 5, 1898.

Application filed May 18, 1896. Serial No. 592,031. (No model.)

*To all whom it may concern:*

Be it known that I, EDWARD W. McCREADY, of Oak Park, Illinois, have invented certain new and useful Improvements in Bicycle Handle-Bars, of which the following is a specification.

My invention relates to an improvement in bicycle handle-bars, and has for its object to combine with the grip or hand piece of a bicycle handle-bar a pump-body, so that by detaching the grip-piece the pump is made available for use and the handle serves not only as a handpiece in riding, but also as a handle for the pump in operating the latter.

In the accompanying drawing I have shown a longitudinal sectional elevation of a construction embodying my invention, showing the end of the handle-bar broken away.

In carrying out my invention I take the ordinary tubular handle-bar A and thread its outer ends preferably interiorly, as shown. With these threads is detachably engaged a handpiece G, consisting of a metal pipe or tube correspondingly threaded at its inner end, having its outer end closed and its body covered with cork or other material C, held in place by the ferrules or caps D. The outer cap or ferrule serves also to close the end of the bore of the handpiece. The handpiece G is, as stated, a metal tube which is provided internally with a piston and suitable air-conduits, whereby it is adapted to serve as a pump as well as a hand-grasp. One end of the pump-barrel protrudes into the hollow of the handle, while the opposite end projects beyond the handle-bar and is adapted to serve as a handpiece by providing it with a suitable gripping material and with ferrules, as in the previous construction. In this adaptation of my invention when the rider desires to use the pump he simply unscrews the handpiece, thus disconnecting the pump-barrel from the handle-bar when the pump is withdrawn. The pump therefore serves the double purpose of a pump and as furnishing a support or a part of the handpiece itself, or, otherwise considered, the handpiece serves its ordinary function as a handpiece and in addition thereto affords a convenient and useful addition to the pump itself, the material of which the handpieces are usually constructed being much more easily held than the smooth surface of the pump itself.

Without limiting myself to precise details of construction, I claim—

1. A tubular bicycle handle-bar in combination with a tubular handpiece detachably connected to the handle-bar, said handpiece being composed of a metal tube internally provided with a piston and air-conduits, whereby it is adapted to serve as a pump, said handpiece being externally provided with a suitable cushion forming a hand-grip, substantially as described.

2. A tubular bicycle handle-bar in combination with a pump-barrel, said parts being adapted for threaded connection with each other, the threads being located externally of the body of the pump and at a point between its ends, the discharge end of the pump being adapted to project into the hollow end of the handle-bar and the remainder of the body of the pump projecting beyond said bar and adapted to serve as a handpiece, substantially as described.

3. The combination, with a hollow handle-bar, of a hollow grip having an outer closed end and an open inner end, and detachably secured to the handle-bar, and a piston in the grip, and having its stem projecting into the handle-bar, substantially as described.

EDWARD W. McCREADY.

Witnesses:
E. L. HUBER,
FREDERICK C. GOODWIN.